United States Patent
Suda et al.

(12)

(10) Patent No.: US 6,627,116 B1
(45) Date of Patent: *Sep. 30, 2003

(54) CARBON-BASED HEATING UNIT AND METHOD FOR PREPARATION THEREOF

(75) Inventors: Yoshihisa Suda, Tokyo (JP); Noboru Kanba, Tokyo (JP); Osamu Shimizu, Tokyo (JP)

(73) Assignee: Mitsubishi Pencil Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/890,032

(22) PCT Filed: Jan. 28, 2000

(86) PCT No.: PCT/JP00/00489

§ 371 (c)(1),
(2), (4) Date: Jul. 27, 2001

(87) PCT Pub. No.: WO00/45621

PCT Pub. Date: Aug. 3, 2000

(30) Foreign Application Priority Data

Jan. 29, 1999 (JP) .......................................... 11-021929

(51) Int. Cl.$^7$ ............................... H01B 1/04; H05B 3/10
(52) U.S. Cl. ..................... 252/502; 328/22 R; 328/228; 219/548; 219/553
(58) Field of Search ............................... 252/502, 503, 252/506; 219/548, 553; 338/22 R, 548

(56) References Cited

U.S. PATENT DOCUMENTS 6,316,054 B1 * 11/2001 Kashiwaya et al. ...... 427/249.1
6,497,829 B2 * 12/2002 Golan ........................ 252/504

FOREIGN PATENT DOCUMENTS

| JP | 63301481 A | 12/1988 |
| JP | 6424383 | 1/1989 |
| JP | 04124076 A | 4/1992 |
| JP | 04317481 A | 11/1992 |
| JP | 11-354257 | 12/1999 |
| WO | 98/59526 | 12/1998 |

* cited by examiner

*Primary Examiner*—Mark Kopec
(74) *Attorney, Agent, or Firm*—Foley & Lardner

(57) ABSTRACT

Carbonization is achieved and impurity elements are removed by combination of a metal or metalloid compound with a composition exhibiting a carbon residual yield that is substantially not zero after firing, followed by firing at a pressure of no higher than $1\times10^{-2}$ Pa and a temperature of from 1500° C. to 2200° C.

2 Claims, No Drawings

CARBON-BASED HEATING UNIT AND METHOD FOR PREPARATION THEREOF

The present invention relates to a carbon heating element with a resistivity and shape that are required of a heating element, and to a method of producing it.

BACKGROUND ART

Worked articles of metal wire such as tungsten wire and Nichrome wire, machined articles of carbon such as isotropic carbon materials and glass carbon, and metal compounds such as silicon carbide have been the primary materials which are conventionally used for resistance heating elements. Among these substances, worked articles of metal wire have been mainly used as heating elements for heaters in small-sized commercial devices, while carbon and metal compounds have been used for industrial furnaces and the like.

Of the conventional materials used for heating elements, carbon differs from metal wire and the like in its excellent properties such as heating rate, heating efficiency and far infrared ray-generating efficiency. However, because conventional carbon heating elements are produced from large plate-like or block-like bodies by machining, the production process is complicated and costly, and production of thin rods and sheets is difficult. Moreover, such heating elements have a problem in that there is no option other than to vary the shape of the elements to control the calorific values of the elements because the heating elements are prepared by cutting blocks, etc., having resistivities in certain specified ranges.

In PCT/JP98/02849 there is proposed a carbon heating element obtained by mixing graphite powder and a metal or metalloid conduction-inhibiting substance such as boron nitride or silicon carbide, with a carbon-containing resin such as chlorinated vinyl chloride resin or the like, and then firing the mixture in an inert gas such as nitrogen gas.

This carbon heating element has excellent characteristics in that it allows control of the resistivity to any desired value by changing the proportion of the carbon as the good electric conductor and the metal or metalloid compound as the conduction-inhibiting substance, and in that it can be formed into any shape before firing to give the desired shape as a carbon heating element.

However, subsequent research has shown that impurity elements such as iron, calcium, potassium or sodium remain in the heating element depending on the starting substances, firing temperature, etc., and that this promotes aging upon repeated conduction use and thereby impairs the properties.

Specifically, when iron is included as an impurity at 100 ppm or greater in the heating element, black deposits are produced on the inner wall of the glass tube of the heater unit during its conduction use, which is undesirable as it prevents radiation of light and heat from the wire material.

When calcium is included at 100 ppm or greater, white deposits are produced on the inner wall of the glass tube of the heater unit during its conduction use, which is undesirable as it also prevents radiation of light and heat from the wire material, In the presence of potassium and sodium, the crystal state of the $SiO_2$ of the glass tubes of the heater unit is altered at the high temperature during conduction, becoming white and brittle. Embrittlement and loss of strength of the glass tube can result in leakage of oxygen gas in an environment and consumption of the heating element by oxidation. Radiation of light and heat is inhibited by embrittlement of the glass tubes.

DISCLOSURE OF THE INVENTION

It is therefore an object of the present invention to provide a carbon heating element with excellent aging resistance and thermal stability over years of repeated conduction use, as well as a method of producing it.

According to the invention, there is provided a carbon heating element comprising carbon as a good electrical conductor, and containing as impurity elements iron at a content of no greater than 100 ppm, calcium at a content of no greater than 100 ppm, potassium at a content of no greater than 50 ppm and sodium at a content of no greater than 50 ppm.

In this carbon heating element, the iron content is preferably no greater than 20 ppm, the calcium content is preferably no greater than 50 ppm and the potassium and sodium contents are preferably both no greater than 10 ppm.

The carbon heating element preferably also contains a metal or metalloid compound as a conduction-inhibiting substance.

The carbon heating element is produced by mixing a metal or metalloid compound with a composition exhibiting a carbon residual yield that is substantially not zero after firing, and then firing the mixture at a pressure of no higher than $1 \times 10^{-2}$ Pa and a temperature of from 1500° C. to 2200° C. Firing at high temperature in such a vacuum can remove the impurity elements that impair the aging resistance and thermal stability of the heating element.

Metals and metalloid compounds include commonly available metal carbides, metal borides, metal silicides, metal nitrides, metal oxides, metalloid nitrides, metalloid oxides, metalloid carbides and the like. The amount of metal or metalloid compound used may be appropriately selected depending on the resistance value and shape of the heating element to be produced, and any one or combination of two or more may be used, but for easier control of the resistance value it is particularly preferred to use boron carbide, silicon carbide, boron nitride or aluminum oxide, preferably at no greater than 80 parts by weight in order to also maintain the excellent properties of the carbon.

The aforementioned composition is an organic substance exhibiting a carbon yield of at least 5% upon firing in an inert gas atmosphere. Specifically there may be mentioned thermoplastic resins such as polyvinyl chloride, polyacrylonitrile, polyvinyl alcohol, polyvinyl chloride-polyvinyl acetate copolymer, polyamides, etc., thermosetting resins such as phenol resins, furan resins, epoxy resins, unsaturated polyester resins, polyimides, etc., natural polymer substances having condensed polycyclic aromatics in the basic structure of the molecule, such as lignin, cellulose, tragacanth gum, gum arabic, sugars, etc., as well as synthetic polymer substances having condensed polycyclic aromatics in the basic structure of the molecule, such as formalin condensate of naphthalenesulfonic acid, copna resins, and the like. The amount of the composition to be used may be appropriately selected depending on the shape of the heating element to be produced, and any one or combination of two or more may be used, but polyvinyl chloride resin and furan resin are particularly preferred; in order to ensure that the excellent properties of the carbon are maintained it is preferably used in an amount of 20 parts by weight or greater.

The composition preferably contains carbon powder. As carbon powders there may be mentioned carbon black, graphite, coke powder and the like; the type and amount of carbon powder used may be appropriately selected depending on the resistance value and shape of the heating element to be produced, and any one or combination of two or more may be used, although graphite is particularly preferred to allow easier control of the shape.

BEST MODE FOR CARRYING OUT THE INVENTION

EXAMPLE 1

After adding 20 wt % of diallyl phthalate monomer as a plasticizer with respect to 1 wt % of natural graphite fine powder (mean particle sizes 5 μm, Nihon Graphite Industry Co., Ltd.) and 66 wt % of boron nitride (mean particle size: 2 um, Shinetsu chemical Co., Ltd.) to 33 wt % of chlorinated vinyl chloride resin (T-741, Nihon Carbide Industries, Ltd.) and dispersing the mixture with a Henschel mixer, a twin roll for mixing with a surface temperature kept at 120° C. was used for repeated thorough kneading to obtain a composition, which was then pelletized with a pelletizer to obtain a molding composition. The pellets were extrusion molded with a screw extruder, and then treated for 10 hours in an air oven heated to 200° C. to make a precursor (carbon precursor) wire material. This was then fired at 1600° C. in a vacuum of $1 \times 10^{-2}$ Pa to obtain a cylindrical carbon heating element.

The carbon heating element had a cross-sectional diameter of 1.3 mmφ and a flexural strength of 250 MPa. The resistivity was measured by the Wheatstone bridge method and found to be $20.7 \times 10^{-3}$ Ω·cm.

The carbon heating element was cut to a length of 300 mm, leads were connected to the ends, and an electric current was applied through a quartz tube in an argon gas atmosphere; the heating element instantaneously reached 1200° C. at 100 V, and far infrared irradiation was confirmed. No cracks were formed and no precipitation was produced on the glass walls of the heater unit during continued use, and a stabilized calorific value was obtained.

For analysis of the impurities, the carbon heating element was immersed in an aqueous hydrochloric acid solution to elute out the metal impurities, and analysis of the eluate by inductively coupled plasma ICP (SII Co.) revealed impurity by iron at 4.4 ppm, calcium at 39.1 ppm, potassium at 1.1 ppm and sodium at 3.3 ppm (see Table 1).

EXAMPLE 2

After adding 20 wt % of diallyl phthalate monomer as a plasticizer with respect to 1 wt % of natural graphite fine powder (mean particle size; 5 μm, Nihon Graphite Industry Co., Ltd.) and 73 wt % of boron nitride (mean particle size: 2 um, Shinetsu Chemical Co., Ltd.) to 26 wt % of chlorinated vinyl chloride resin (T-741, Nihon Carbide Industries, Ltd.) and dispersing the mixture with a Henschel mixer, a twin roll for mixing with a surface temperature kept at 120° C. was used for repeated thorough kneading to obtain a composition, which was then pelletized with a pelletizer to obtain a molding composition. The pellets were extrusion molded with a screw extruder, and then treated for 10 hours in an air oven heated to 200° C. to make a precursor (carbon precursor) wire material. This was then fired at 1600° C. in a vacuum of $1 \times 10^{-2}$ Pa to obtain a cylindrical carbon heating element.

The carbon heating element had a cross-sectional diameter of 2.2 mmφ and a flexural strength of 230 MPa. The resistivity was measured by the Wheatstone bridge method and found to be $25.5 \times 10^{-3}$ Ω·cm.

The carbon heating element was cut to a length of 300 mm, leads were connected to the ends, and an electric current was applied through a quartz tube in an argon gas atmosphere; the heating element instantaneously reached 1200° C. at 100 V, and far infrared irradiation was confirmed. No cracks were formed and no precipitation was produced on the glass walls of the heater unit during continued use, and a stabilized calorific value was obtained.

For analysis of the impurities, the carbon heating element was immersed in an aqueous hydrochloric acid solution to elute out the metal impurities, and analysis of the eluate by inductively coupled plasma ICP (SII Co.) revealed impurity by iron at 3.4 ppm, calcium at 19.2 ppm, potassium at 0.9 ppm and sodium at 8.3 ppm (see Table 1).

COMPARATIVE EXAMPLE 1

After adding 20 wt % of diallyl phthalate monomer as a plasticizer with respect to 1 wt % of natural graphite fine powder (mean particle size: 5 μm, Nihon Graphite Industry Co., Ltd.) and 66 wt % of boron nitride (mean particle size: 2 um, Shinetsu Chemical Co., Ltd.) to 33 wt % of chlorinated vinyl chloride resin (T-741, Nihon Carbide Industries, Ltd.) and then treating it and extrusion molding in the same manner as Example 1, it was then treated for 10 hours in an air oven heated to 200° C. to make a precursor (carbon precursor) wire material. This was then fired at 1600° C. in an argon gas atmosphere to obtain a cylindrical carbon heating element.

The carbon heating element had a cross-sectional diameter of 1.3 mmφ and a flexural strength of 265 MPa. The resistivity was measured by the Wheatstone bridge method and found to be $21.4 \times 10^{-3}$ Ω·cm.

The carbon heating element was cut to a length of 300 mm, leads were connected to the ends, and an electric current was applied through a quartz tube in an argon gas atmosphere; the heating element instantaneously reached 1200° C. at 100 V, and far infrared irradiation was confirmed. However, although no cracks were formed during continued use, the electric current value varied and a white precipitate formed on the inner wall of the glass tube of the heater unit, and a stabilized calorific value was unobtainable.

For analysis of the impurities, the carbon heating element was immersed in an aqueous hydrochloric acid solution to elute out the metal impurities, and analysis of the eluate by inductively coupled plasma ICP (SII Co.) revealed impurity by iron at 4.4 ppm, calcium at 294.3 ppm, potassium at 1.5 ppm and sodium at 3.3 ppm (see Table 1).

COMPARATIVE EXAMPLE 2

After adding 20 wt % of diallyl phthalate monomer as a plasticizer with respect to 1 wt % of natural graphite fine powder (mean particle size: 5 μm, Nihon Graphite Industry Co., Ltd.) and 73 wt % of boron nitride (mean particle size: 2 um, Shinetsu Chemical Co., Ltd.,) to 26 wt % of chlorinated vinyl chloride resin (T-741, Nihon Carbide Industries, Ltd.,) and then treating it and extrusion molding in the same manner as Example 2, it was then treated for 10 hours in an air oven heated to 200° C. to make a precursor (carbon precursor) wire material. This was then fired at 1600° C. in an argon gas atmosphere to obtain a cylindrical carbon heating element.

The carbon heating element had a cross-sectional diameter of 2.2 mmφ and a flexural strength of 240 MPa. The resistivity was measured by the Wheatstone bridge method and found to be $26.4 \times 10^{-3}$ Ω·cm.

The carbon heating element was cut to a length of 300 mm, leads were connected to the ends, and an electric current was applied through a quartz tube in an argon gas atmosphere; the heating element instantaneously reached 1200° C. at 100 V, and far infrared irradiation was confirmed. However, although no cracks ware formed during continued use, the electric current value varied and a black precipitate formed on the inner wall of the glass tube of the heater unit, and a stabilized calorific value was unobtainable.

For analysis of the impurities, the carbon heating element was immersed in an aqueous hydrochloric acid solution to elute out the metal impurities, and analysis of the eluate by inductively coupled plasma ICP (SII Co.) revealed impurity by iron at 161.4 ppm, calcium at 38.3 ppm, potassium at 0.9 ppm and sodium at 5.2 ppm (see Table 1).

COMPARATIVE EXAMPLE 3

After adding 20 wt % of diallyl phthalate monomer as a plasticizer with respect to 1 wt % of natural graphite fine powder (mean particle size: 5 μm, Nihon Graphite Industry Co., Ltd.) and 60 wt % of boron nitride (mean particle size: 2 um, Shinetsu Chemical Co., Ltd.) and 4 wt % of silicon carbide to 35 wt % of chlorinated vinyl chloride resin (T-741, Nihon Carbide Industries, Ltd.) and then treating it and extrusion molding in the same manner as Example 1, it was then treated for 10 hours in an air oven heated to 200° C. to make a precursor (carbon precursor) wire material. This was then fired at 1800° C. in an argon gas atmosphere to obtain a cylindrical carbon heating element.

The carbon heating element had a cross-sectional diameter of 1.35 mmφ and a flexural strength of 311 MPa. The resistivity was measured by the Wheatstone bridge method and found to be $18.4 \times 10^{-3}$ Ω·cm.

The carbon heating element was cut to a length of 300 mm, leads were connected to the ends, and an electric current was applied through a quartz tube in an argon gas atmosphere; the heating element instantaneously reached 1200° C. at 100 V, and far infrared irradiation was confirmed. With continued use, however, the glass tube of the heater unit exhibited whitening and embrittlement, argon gas leaked out, oxidation wear of the carbon heating element occurred, the electric current value varied and a stabilized calorific value was unobtainable.

For analysis of the impurities, the carbon heating element was immersed in an aqueous hydrochloric acid solution to elute out the metal impurities, and analysis of the eluate by inductively coupled plasma ICP (SII Co.) revealed impurity by iron at 2.3 ppm, calcium at 13.1 ppm, potassium at 30.1 ppm and sodium at 102.5 ppm.

TABLE 1

| | Impurity element content (ppm) | | | | |
|---|---|---|---|---|---|
| | Fe | Ca | K | Na | Result |
| Example 1 | 4.4 | 39.1 | 1.1 | 3.3 | Stabilized calorific value |
| Example 2 | 3.4 | 19.2 | 0.9 | 8.3 | Stabilized calorific value |
| Comp. Ex. 1 | 4.4 | 294.3 | 1.5 | 3.3 | Current variation, white precipitate |
| Comp. Ex. 2 | 161.4 | 39.3 | 0.9 | 5.2 | Current variation, black precipitate |
| Comp. Ex. 3 | 2.3 | 13.1 | 30.1 | 102.5 | Embrittlement of gloss tube |

As demonstrated above, the present invention provides a carbon heating element with excellent aging resistance and thermal stability, and a method for its production.

What is claimed is:

1. A method of producing a carbon heating element, comprising the steps of mixing a metal or metalloid compound with a composition exhibiting a carbon residual yield that is substantially not zero after firing, and firing the mixture at a pressure of no higher than $1 \times 10^{-2}$ Pa and a temperature of from 1500° C. to 2200° C., to thereby make a carbon heating element comprising carbon as a good electrical conductor, and containing as impurity elements iron at a content of no greater than 100 ppm, calcium at a content of no greater than 100 ppm, potassium at a content of no greater than 50 ppm and sodium at a content of no greater than 50 ppm.

2. A method according to claim 1, wherein the iron content of the carbon heating element is no greater than 20 ppm, the calcium content is no greater than 50 ppm and the potassium and sodium contents are both no greater than 10 ppm.

* * * * *